July 17, 1928.  
I. GONYK  
1,677,441
AUTOMATIC LUBRICATING DEVICE FOR HINGES OF DOORS AND WINDOWS
Filed March 10, 1927
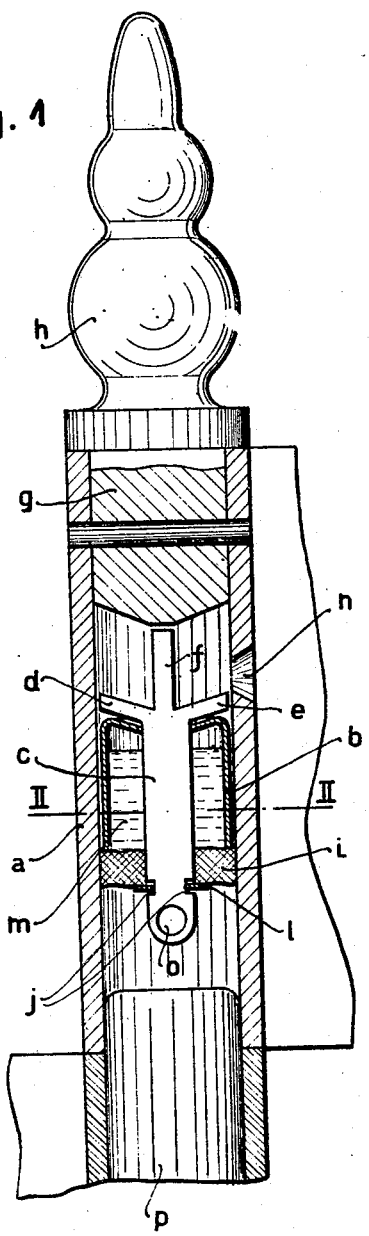
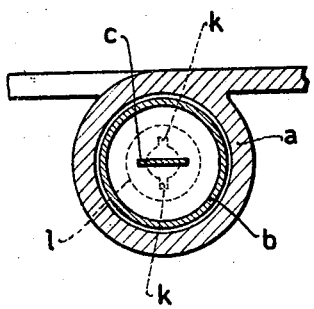

Patented July 17, 1928.

1,677,441

UNITED STATES PATENT OFFICE.

IGNATZ GONYK, OF LJUBLJANA, YUGOSLAVIA.

AUTOMATIC LUBRICATING DEVICE FOR HINGES OF DOORS AND WINDOWS.

Application filed March 10, 1927, Serial No. 174,361, and in Germany March 17, 1926.

My invention relates to an automatic lubricating device for the hinges of doors and windows, and it has for its object to secure automatic and reliable lubrication in the parts of the hinges exposed to friction. One feature of the invention consists in providing a lubricating means capable of being inserted into the hollow part of the hinge without altering the construction of such hinge. A further feature of the device according to the invention consists in that filling of the container may take place without dismounting the parts of the device.

For this purpose the invention comprises a small container for a suitable lubricating agent of cylindrical shape so as to be capable of being inserted into the tubular knuckle between the usual protecting cover of the knuckle, which has to be provided, to close the hinge and the pintle which is guided in said knuckle. This container is provided with a funnel shaped cover and a bottom made of porous material tightly rubbing against the inner wall of the knuckle. The said bottom which also holds the container in its place by virtue of the friction between its peripheral part and the inner surface of the wall of the knuckle is held in its place by a flat pin with a divided or forked upper end. The laterally extending parts of said upper end is adapted to rest on the funnel shaped cover of the container and to be supported thereon. The flat pin thus supported by the cover, also carries the bottom of porous material by means of a washer capable of being secured upon it and is provided with a handle for withdrawing the whole self contained lubricating device.

In order to allow refilling of the container, without dismounting the parts, a small bore may be made in the lateral wall of the knuckle below the cover and to avoid overrunning said opening when inserting the container, the divided end is provided with a stop capable of abutting against the cover of the knuckle and of arresting the container in such a position that the funnel shape cover of the container will just be in a convenient position to receive the lubricating agent filled in through said bore.

The accompanying drawing shows by way of example an embodiment of the device according to the invention.

Fig. 1 is a view of the device partly in section;

Fig. 2 is a section along the line II—II of Fig. 1.

$b$ is a cylindrical container for a lubricating agent such as oil which fits into the upper sleeve-shaped portion or knuckle $a$ of the hinge. The cover of the container is funnel-shaped. A flat pin $c$ extends through the entire lubricating container and through the funnel-shaped top. The upper end of said pin consists of three parts, two of these parts $d$ and $e$ prevent the pin from falling through the container whereas the vertical middle part $f$ serves as a stop abutting against the cover bolt $g$ of the strap-hinge $h$. The lower end of pin $c$, serves for holding in place the porous bottom $i$ of the container consisting for instance of felt. For the said purpose the lower end of the pin has an incision $j$ on either side capable of retaining a washer $l$. The washer is provided with a slot $k$ of a length sufficient to allow it to be slid along the pin and is inserted from below. It can then be turned 90° when it has reached the incision $j$ and is retained there thus holding in its turn the felt pad $i$ against the lower end of the cylindrical container $b$ previously brought into its position on the pin $c$ and supported by friction against the wall of the sleeve or knuckle $a$.

The lubricating agent $m$ escaping from container $b$ through the felt $i$ drops continuously in small quantities at a time on to the pintle $p$ of the hinge and into the space between pintle $p$ and sleeve or knuckle $a$ to be lubricated.

Refilling of the container usually takes place through a bore $n$ in the wall of sleeve $a$. In order to prevent incorrect insertion of the container $b$, so that the opening $n$ is overrun and is thus wholly or partly closed by the wall of the container, the upwardly projecting part or stop $f$ of the pin is provided which is of such a length that it will abut against the cover bolt $g$ before such overrunning of the opening $n$ takes place and will therefore ensure a correct position of the container $b$ below such opening so that any lubricant filled through opening $n$ will drop into the funnel shaped cover and will flow from there into the container. Removal of the whole container is effected by means of pin $c$ which holds the parts together, the lower end of the pin being for this purpose shaped so as to form an ear $o$ which serves as a handle.

It will thus be seen that the lubricating means above described may be inserted in any existing hinge with very little adaptation of the same. It is only necessary to have or to create a free space between the pintle and the cover bolt of sufficient length to allow a small container to be inserted, which will then be held in a correct position by means of the felt pressing against the walls or by means of the handle *o* resting against the surface of the pintle. Moreover a bore has to be made to allow filling of the lubricating agent. The upwardly projecting part or stop *f* of the pin *c* will then secure a correct position of said container when inserted from below with respect to said opening or bore *n*. It ensures a clear and free space below the underface of the cover bolt *g* and above the funnel shaped cover of the container. It is therefore, only necessary to arrange the opening *n* within said clear distance which must thus be maintained between the parts. Any inconvenience due to incorrect manipulation of the parts is thus avoided.

What I claim is:

1. A lubricating device for hinges of doors or windows, comprising a container for the lubricating agent adapted to be inserted into the hollow part of the knuckle and consisting of a vessel with funnel shaped cover, a bottom piece of porous material adapted to close said vessel from the under side and to fit exactly into the hollow part of the knuckle so as to be able to support the container and through which the lubricant may very slowly penetrate, and a central pin adapted to engage the cover and the porous bottom of said container to hold said parts together.

2. In a hinge for doors or windows, comprising a hollow knuckle, a pintle guided therein, a cover bolt for closing the knuckle at its upper part, a lubricating device consisting of a vessel capable of being inserted into the hollow part of the knuckle above the pintle open at its underside and provided with a funnel shaped cover at its upper side, a bottom piece of porous material closing the underside of said vessel, through which any lubricant filled into the vessel may slowly penetrate, a central pin provided with upper projections adapted to engage the cover and with means for holding the porous bottom so as to hold these parts together, and being further provided with an upwardly projecting stop adapted to act as a distance piece to ensure a clear space above the funnel.

3. In a hinge for doors or windows, comprising a pintle, a hollow knuckle guiding said pintle and provided with a filling hole for a lubricating agent, a cover bolt for said hollow knuckle, an automatic lubricating device capable of being inserted in said hollow knuckle above the pintle, said lubricating device consisting of a cylindrical vessel having a funnel shaped cover open at the under side and a bottom piece of porous material through which the liquid contents of the vessel may slowly penetrate, said bottom piece being of a size exactly fitting into the hollow space and capable of supporting said vessel by friction on the inner walls of the knuckle, the whole lubricating vessel being held supported within the hollow knuckle at any place above the pintle, a central pin passing through the cover and bottom of said vessel and provided with projections engaging the cover and with a removable washer for holding the porous bottom so as to hold all parts of the vessel together, said pin being also provided with a central projection adapted to abut against the cover bolt of the knuckle so as to ensure a correct minimum distance between said cover bolt and said vessel, in order to ensure a correct position of the latter with respect to the filling hole in the knuckle.

4. In a hinge for doors or windows provided with an automatic lubricating device according to claim 3, a central pin consisting of a flat bar provided with two lateral projections inclined at exactly the same angle as the funnel shaped cover of the vessel and an upright end adapted to act as a stop, said pin being moreover provided with a handle at its lower end, and with lateral incisions above said handle adapted to retain a washer supporting the porous bottom.

In testimony whereof I have hereunto set my hand.

IGNATZ GONYK.